June 23, 1931.  L. MURPHY  1,811,801
APPARATUS FOR INDICATING THE DEPTH OF
LIQUIDS IN TANKS OR OTHER CONTAINERS
Original Filed March 15, 1928   2 Sheets-Sheet 1

Patented June 23, 1931

1,811,801

UNITED STATES PATENT OFFICE

LEONARD MURPHY, OF DUBLIN, IRELAND

APPARATUS FOR INDICATING THE DEPTH OF LIQUIDS IN TANKS OR OTHER CONTAINERS

Original application filed March 15, 1928, Serial No. 261,919, and in Great Britain May 5, 1927. Divided and this application filed April 13, 1929. Serial No. 354,923.

This application is a division of application Number 261,919, filed March 15, 1928.

The invention relates to apparatus for indicating the depth of liquids in tanks or other receptacles and is of the known type in which air is supplied by a compressor to a line pipe in connection with an indicating device placed at any required position, means being provided by which the line pipe is in communication with the bottom of the tank, so that air can rise through the liquid and escape freely if the pressure in the line pipe tends to rise beyond that corresponding to the depth of the liquid.

According to the invention, a float is contained in a vessel, closed above and open below, placed at the bottom of the tank or other receptacle and in communication with the line pipe, the float rising when the pressure in the line pipe falls below that due to the depth of liquid in the tank. As the float rises electric contacts are closed, completing a circuit energizing, either directly or by means of a relay, an electric motor connected to the air compressor. When the pressure in the line pipe again balances that due to the liquid, the float falls and the circuit is again broken and the motor and air compressor brought to rest.

Figure 1:
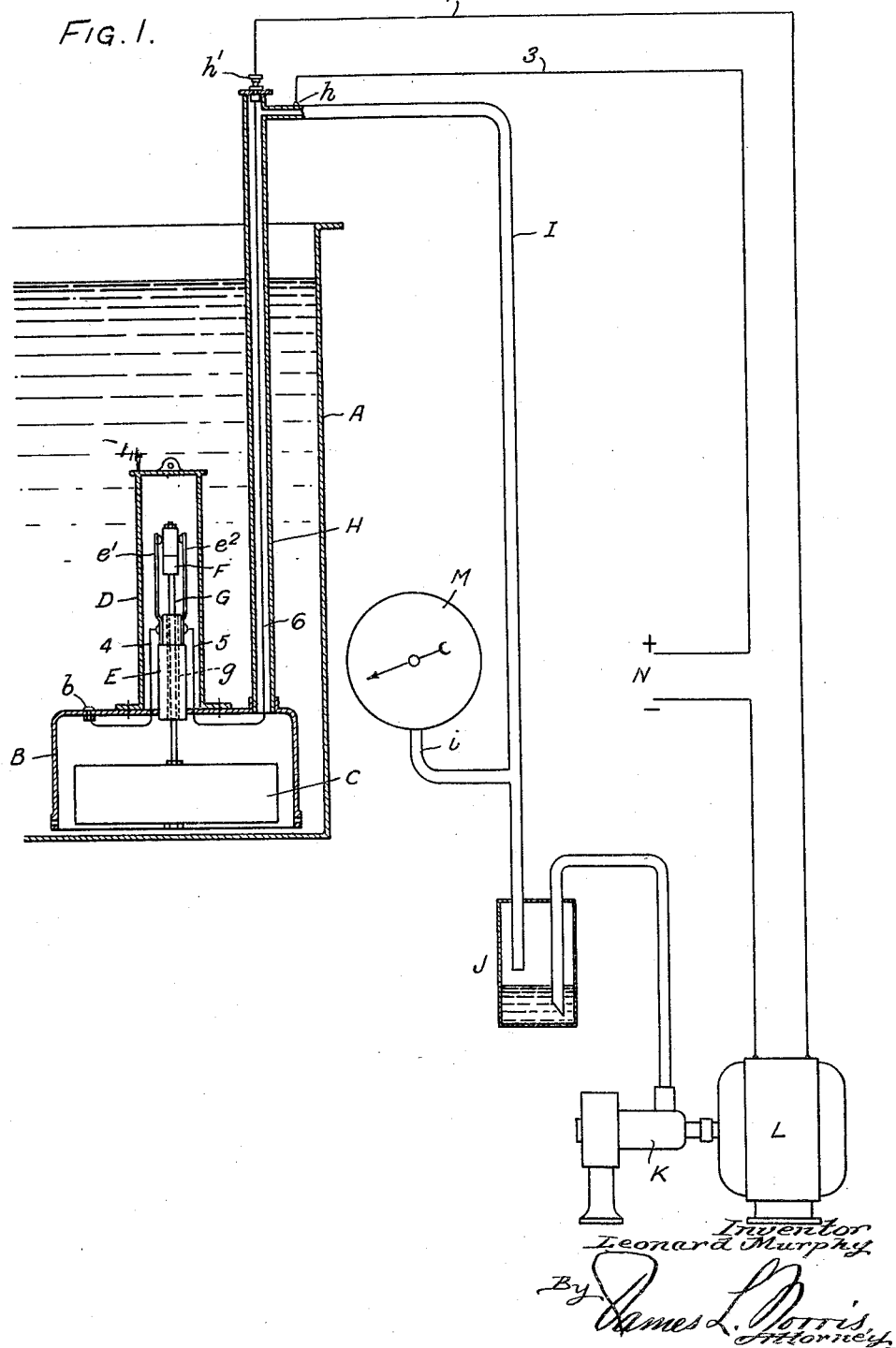
Figure 2:
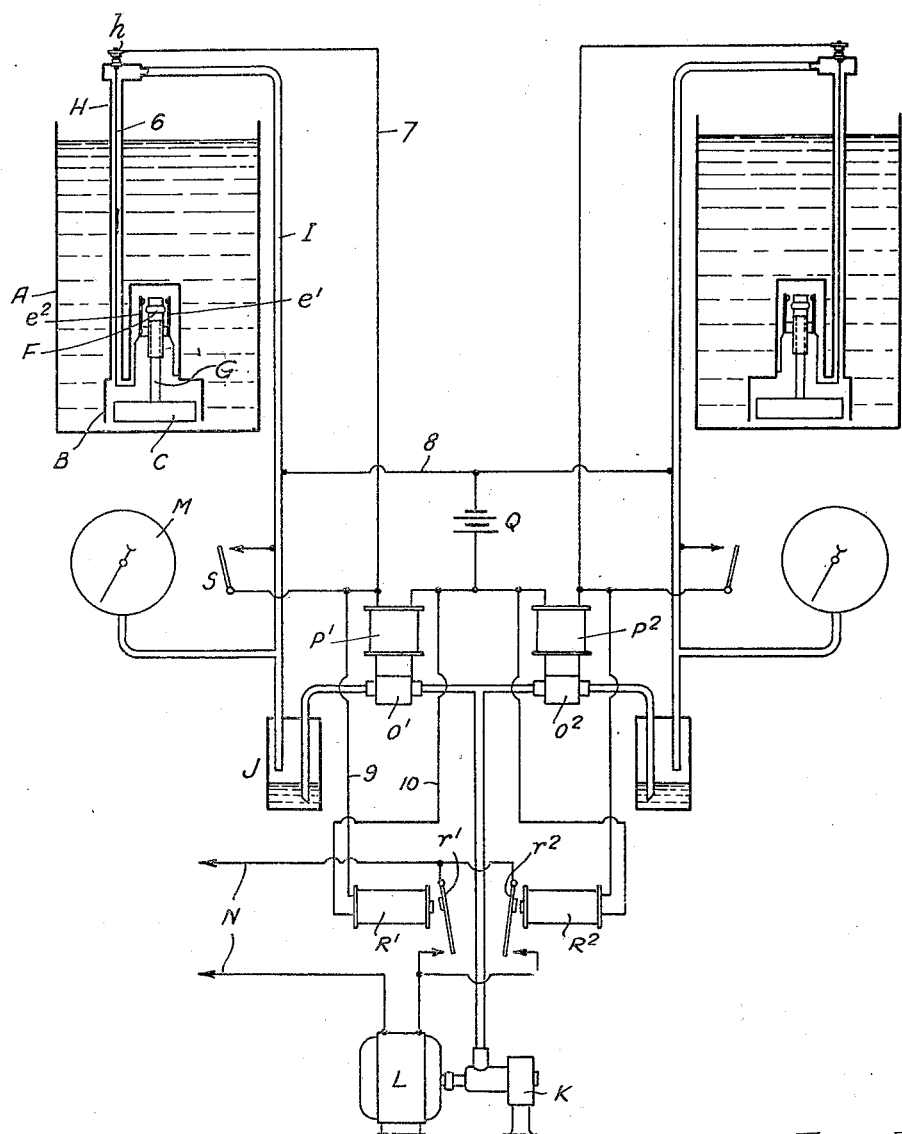

In the accompanying drawings which represent indicating apparatus according to the invention, Fig. 1 is a diagrammatic view, partly in section, of the arrangement fitted to a single tank, and Fig. 2 a similar view of apparatus adapted for indicating the level of the liquid in a plurality of tanks.

Referring to Fig. 1, a heavy bell-shaped vessel B, placed at the bottom of the tank A, encloses a float C and carries on its upper surface a closed vertical casing D in which are mounted two spring contacts $e'$, $e^2$ secured to a cylindrical insulating block E. The contacts are electrically connected when the float C rises above its normal position by a conducting collar F on a spindle G, secured to the centre of the upper side of the float, and passing through an axial aperture $g$ in the block E. A second collar of non-conducting material, mounted on the spindle G above the collar F, extends between the contacts $e'$ and $e^2$ when the float C is in its lowermost position.

A vertical tube H of conducting material communicates with the upper part of the interior of the vessel B and at its upper end with a line pipe I charged with air over a liquid seal J by a compressor K driven by an electric motor L. M is a pressure gauge which may be of any suitable known type, connected to the line pipe I by a branch $i$ indicating continuously the pressure in the line pipe and consequently the depth of liquid in the receptacle.

When the contacts $e'$, $e^2$ are connected by the collar F on the spindle G, a circuit is established energizing the motor L from the positive pole of the source of current N over lead 3, terminal $h$ on tube H, metal casing of vessel B, fixed contact $b$, lead 4, spring contact $e'$, collar F, spring contact $e^2$, lead 5, wire 6 in tube H, contact $h'$ on the upper end of but insulated from tube H, lead 7, motor L to negative pole of source. The motor L actuates the air compressor K and charges the line pipe I. When the pressure supplied to the tube H by the compressor K again balances the pressure due to the liquid, the float C falls, the current is interrupted and the motor and air compressor again brought to rest.

The circuit described can be modified by the contacts $e'$, $e^2$ being connected in a local circuit which, when closed, energizes a relay which connects the source of current M to the motor.

This arrangement is illustrated in Fig. 2, which also represents arrangements by which a plurality (two in the example shown) of receptacles containing liquid, the depth of which is to be indicated, are connected to a single motor and air compressor.

The circuit arrangements and apparatus connected with each receptacle are substantially as shown in Fig. 1, with the addition of a valve $O'$ or $O^2$ operated by the plunger of a solenoid $P'$ or $P^2$ in each line pipe and relay magnets $R'$, $R^2$ energized from a local battery Q.

As the circuits of each receptacle are similar, it will be sufficient to trace the connections for one receptacle only.

When the contacts $e'$, $e^2$ are connected by the collar F of the spindle G, current flows from one pole of the battery Q, over lead 8, line pipe I, tube H, casing B, contact $e'$, collar F, contact $e^2$, wire 6, contact $h$, lead 7, solenoid P′ to the other pole of the battery Q. The plunger of the solenoid opens valve O′. The solenoid P′ is connected in parallel by leads 9 and 10 with the relay magnet R′, which attracts its armature $r'$ and connects up the circuit of the motor L.

By closing a switch S, the contacts $e'$, $e^2$ are short circuited and check observations can be made at any time in order to detect any fault in the electric circuit in the vessel B.

Having thus described the nature of my said invention and the best means I know of carrying the same into practical effect, I claim:—

1. Apparatus of the type described for indicating the depth of liquid in a tank or other receptacle, the said apparatus comprising an air compressor, an electric motor actuating said air compressor, a line pipe charged with air from said compressor, an indicating device actuated by the pressure in said line pipe, a vessel open below and closed above and located at the bottom of said receptacle, a tube communicating with said line pipe and opening into the upper part of said vessel, a float in said vessel, a source of electric current, an electric circuit between said source and said motor, and means actuated by the rise of said float to close said circuit.

2. Apparatus according to claim 1, wherein a casing is attached to the upper part of said vessel, and the circuit closing means comprises electric contacts fixed within said casing, a spindle secured to said float, a collar on said spindle to bridge said contacts and thereby close said circuit when the pressure in the line pipe falls below that due to the depth of liquid.

3. Apparatus of the type described for indicating the depth of liquid in a plurality of tanks or other receptacles, said apparatus comprising an air compressor, an electric motor for actuating said air compressor, an electric circuit to said motor, electrically actuated means for closing said circuit, a line pipe charged with air from said compressor, a plurality of vessels for immersion, respectively, at the lower portions of said receptacles, each of said vessels being closed at its upper end and open at its lower end, the upper ends of said vessels being connected, respectively, to said branch pipes, a normally closed valve in each branch pipe, an electromagnetic device for opening each of said valves, an electric circuit to each of said electromagnetic devices and said motor circuit closing means, a float in each of said vessels, and electric contact devices by which the rise of a float in any vessel closes the electric circuit to the corresponding electromagnetic device to open the valve in the corresponding branch line and actuates the motor-circuit closing means to energize said motor.

4. Apparatus of the type described for indicating the depth of liquid in a plurality of tanks or other receptacles, said apparatus comprising an air compressor; an electric motor for actuating said air compressor; a source of electrical supply; a normally open electric circuit connecting said source to said motor; a plurality of electrically actuated devices, each operative when actuated to close said electric circuit; a line pipe charged with air from said compressor; branch pipes from said line pipe; a plurality of vessels for immersion, respectively, at the lower portions of said receptacles, each of said vessels being closed at its upper end and open at its lower end, the upper portions of said vessels being connected, respectively, to said branch pipes; a casing attached to the upper part of each of said vessels; a normally closed valve in each branch pipe; a plurality of electromagnetic devices, each operative when energized to open one of said valves; a local source of current; electric circuits between said local source of current and said electromagnetic devices and between each of said electromagnetic devices and one of said motor circuit closing devices; electric contacts in each of said casings, the electric contacts in each casing being in the electric circuit between the local source of current and the electromagnetic device which controls the valve in the branch pipe connected to the vessel associated with such casing; a float in each of said vessels; and means carried by each float and operative, when such float rises, to bridge the contacts in the casing associated with the vessel in which such float is contained and close the electric circuit to the corresponding electromagnetic device and electrically actuated device.

5. Apparatus of the type described for indicating the depth of liquid in a plurality of tanks or other receptacles, said apparatus comprising an air compressor; an electric motor for actuating said air compressor; an electric circuit to said motor; relay magnets each operative when energized to close said motor circuit; a line pipe charged with air from said air compressor; branch pipes from said line pipe; a plurality of vessels for immersion, respectively, at the lower portions of said receptacles, each of said vessels being closed at its upper end and open at its lower end, the upper ends of said vessels being connected, respectively, to said branch pipes; a normally closed valve in each branch pipe; an electromagnetic device for opening each of said valves; electric circuits connecting each of said electromagnetic devices to one of said relay magnets; a float in each of said vessels;

and means by which the rise of a float in any vessel closes the circuit to the electromagnetic device which controls the valve in the branch pipe to which such vessel is connected and to the corresponding relay magnet.

6. Apparatus of the type described for indicating the depth of liquid in a plurality of tanks or other receptacles, said apparatus comprising an air compressor; an electric motor for actuating said compressor; a source of electric supply; a normally open electric circuit to said motor; a plurality of relay magnets each operative when energized to close said electric circuit; a line pipe charged with air by said compressor; a plurality of vessels for immersion, respectively, at the lower portions of said receptacles, each of said vessels having its lower end open and its upper end closed; a plurality of branch pipes from said line pipe, means connecting each of said branch pipes to the upper portion of a different one of said vessels; a valve in each of said branch pipes; a casing attached to the upper part of each of said vessels, a pair of contacts in each of said casings; a plurality of electromagnetic devices each associated with a different one of said valves and each operative when actuated, to open its associated valve; a local source of current; a plurality of electrical circuits from said local source, each of said circuits including one of said relay magnets, the pair of contacts in one of said casings and the electromagnetic device for operating the valve in the branch pipe to the vessel to which such casing is attached; a float in each of said vessels; and means operative by the rise of each float to bridge the contacts in the casing attached to the vessel in which such float is contained.

7. Apparatus according to claim 1, wherein the means actuated by the float for connecting the source of current to the motor comprises a casing attached to the upper part of said vessel, electric contacts fixed within said casing, a spindle secured to said float, and a collar on said spindle connecting said contacts when the pressure in the line pipe falls below that due to the depth of liquid, and wherein means are provided for short circuiting at any time the current through said contacts.

8. Apparatus of the type described for indicating the depth of liquid in a plurality of tanks or other receptacles, said apparatus comprising an air compressor; an electric motor for actuating said air compressor; an electric circuit to said motor; a line pipe charged with air from said compressor; branch pipes from said line pipe; a plurality of vessels for immersion, respectively, at the lower portions of said receptacles, each of said vessels being closed at its upper end and open at its lower end, said vessels having their upper ends connected, respectively, to said branch pipes; a normally closed valve in each branch pipe; an electromagnetic device for opening each of said valves; relay magnets for closing the electric circuit to said motor; circuits connecting said relay magnets, respectively, to said electromagnetic devices; a casing attached to the upper part of each of said vessels; electric contacts fixed within each of said casings; the electric contacts in each casing being in the electric circuit to the electromagnetic device associated with the corresponding vessel; a float in each of said vessels; a spindle secured to each float; a collar on each of said spindles for bridging the contacts in the casing associated with the vessel in which its associated float is contained when such float rises to close the electric circuit to the corresponding electromagnetic device and also energize the corresponding relay magnet; and a switch in the circuit of each of said casings by which the contacts in such casing can be short circuited at any time.

In testimony whereof I have signed my name to this specification.

LEONARD MURPHY.